US012597612B2

(12) United States Patent
Yamatani

(10) Patent No.: US 12,597,612 B2
(45) Date of Patent: Apr. 7, 2026

(54) NONAQUEOUS ELECTROLYTE ENERGY STORAGE DEVICE, AND METHOD FOR MANUFACTURING NONAQUEOUS ELECTROLYTE ENERGY STORAGE DEVICE

(71) Applicant: GS Yuasa International Ltd., Kyoto (JP)

(72) Inventor: Norio Yamatani, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 673 days.

(21) Appl. No.: 17/797,987

(22) PCT Filed: Feb. 16, 2021

(86) PCT No.: PCT/JP2021/005622
§ 371 (c)(1),
(2) Date: Aug. 5, 2022

(87) PCT Pub. No.: WO2021/166877
PCT Pub. Date: Aug. 26, 2021

(65) Prior Publication Data
US 2023/0087788 A1 Mar. 23, 2023

(30) Foreign Application Priority Data
Feb. 21, 2020 (JP) ................................ 2020-028726

(51) Int. Cl.
*H01M 4/62* (2006.01)
*H01G 11/46* (2013.01)
(Continued)

(52) U.S. Cl.
CPC .............. *H01M 4/62* (2013.01); *H01G 11/46* (2013.01); *H01G 11/64* (2013.01); *H01G 11/86* (2013.01);
(Continued)

(58) Field of Classification Search
CPC ........ H01M 4/62; H01M 4/131; H01M 4/505; H01M 4/525; H01M 2004/028; H01M 2300/0025; H01M 10/054
See application file for complete search history.

(56) References Cited

U.S. PATENT DOCUMENTS 11,251,427 B2 2/2022 Muramatsu
11,545,662 B2 1/2023 Endo et al.
(Continued)

FOREIGN PATENT DOCUMENTS

JP 2007-53081 A 3/2007
JP 5257272 B2 8/2013
(Continued)

OTHER PUBLICATIONS

International Search Report (ISR) dated May 11, 2021 filed in PCT/JP2021/005622.

*Primary Examiner* — Ula C Ruddock
*Assistant Examiner* — Sydney L Kline
(74) *Attorney, Agent, or Firm* — RANKIN, HILL & CLARK LLP

(57) ABSTRACT

An aspect of the present invention is a nonaqueous electrolyte energy storage device including: a positive electrode including a positive composite layer containing a transition metal oxide and a boron element; a negative electrode; and a nonaqueous electrolyte containing a sulfuric acid ester compound, in which the content of the boron element in the positive composite layer is 0.03% by mass or more.

6 Claims, 2 Drawing Sheets

(51) Int. Cl.

| | |
|---|---|
| ***H01G 11/64*** | (2013.01) |
| ***H01G 11/86*** | (2013.01) |
| ***H01M 4/02*** | (2006.01) |
| ***H01M 4/131*** | (2010.01) |
| ***H01M 4/505*** | (2010.01) |
| ***H01M 4/525*** | (2010.01) |
| ***H01M 10/0567*** | (2010.01) |
| ***H01M 10/058*** | (2010.01) |

(52) U.S. Cl.

CPC ........... *H01M 4/131* (2013.01); *H01M 4/505* (2013.01); *H01M 4/525* (2013.01); *H01M 10/0567* (2013.01); *H01M 10/058* (2013.01); *H01M 2004/028* (2013.01); *H01M 2300/0025* (2013.01)

(56) References Cited

U.S. PATENT DOCUMENTS

| | | | | |
|---|---|---|---|---|
| 11,652,237 | B2 | 5/2023 | Fujiyama et al. | |
| 12,381,201 | B2 | 8/2025 | Endo et al. | |
| 12,388,116 | B2 | 8/2025 | Muramatsu et al. | |
| 2004/0229124 | A1* | 11/2004 | Miyamoto ............ | H01M 4/505<br>429/231.95 |
| 2005/0106463 | A1 | 5/2005 | Kikuchi et al. | |
| 2007/0231695 | A1 | 10/2007 | Kikuchi et al. | |
| 2008/0280205 | A1* | 11/2008 | Jiang ...................... | C01G 53/50<br>423/598 |
| 2009/0050841 | A1 | 2/2009 | Sasaki et al. | |
| 2009/0081547 | A1 | 3/2009 | Nakura | |
| 2009/0087740 | A1 | 4/2009 | Deguchi et al. | |
| 2010/0018034 | A1* | 1/2010 | Miyasaka ............ | H01M 4/505<br>29/623.1 |
| 2011/0256453 | A1 | 10/2011 | Kikuchi et al. | |
| 2014/0054495 | A1 | 2/2014 | Paulsen et al. | |
| 2015/0270575 | A1 | 9/2015 | Nishie et al. | |
| 2016/0013476 | A1* | 1/2016 | Oh ...................... | H01M 4/1391<br>427/126.3 |
| 2017/0346127 | A1* | 11/2017 | Zhang ................... | H01M 4/131 |
| 2018/0138551 | A1 | 5/2018 | Miyasato et al. | |
| 2018/0351169 | A1 | 12/2018 | Oh et al. | |
| 2019/0334197 | A1 | 10/2019 | Burkhardt et al. | |
| 2020/0203768 | A1 | 6/2020 | Fujiyama et al. | |
| 2020/0381720 | A1 | 12/2020 | Endo et al. | |
| 2021/0075012 | A1 | 3/2021 | Muramatsu | |
| 2021/0126288 | A1 | 4/2021 | Fujiyama et al. | |
| 2021/0249645 | A1 | 8/2021 | Endo et al. | |
| 2021/0257665 | A1 | 8/2021 | Muramatsu et al. | |
| 2023/0078256 | A1 | 3/2023 | Endo et al. | |

FOREIGN PATENT DOCUMENTS

| | | | | |
|---|---|---|---|---|
| JP | 5260821 | B2 | | 8/2013 |
| JP | 2013-239466 | A | | 11/2013 |
| JP | 5660353 | B2 | | 1/2015 |
| JP | 2015138627 | A | * | 7/2015 |
| JP | 2015-162304 | A | | 9/2015 |
| JP | 2017-17002 | A | | 1/2017 |
| JP | 2018-49821 | A | | 3/2018 |
| JP | 2018-73481 | A | | 5/2018 |
| JP | 2018181772 | A | * | 11/2018 |
| JP | 2019-530157 | A | | 10/2019 |
| JP | 2020-13747 | A | | 1/2020 |
| JP | 2021086789 | A | | 6/2021 |
| WO | 2007/007636 | A1 | | 1/2007 |
| WO | 2013/031523 | A1 | | 3/2013 |
| WO | 2014/054197 | A1 | | 4/2014 |
| WO | 2015/065046 | A1 | | 5/2015 |
| WO | 2015/111191 | A1 | | 7/2015 |
| WO | 2017/126640 | A1 | | 7/2017 |
| WO | 2019/039345 | A1 | | 2/2019 |
| WO | 2019039346 | A1 | | 2/2019 |
| WO | 2019244955 | A1 | | 12/2019 |

* cited by examiner

NONAQUEOUS ELECTROLYTE ENERGY STORAGE DEVICE, AND METHOD FOR MANUFACTURING NONAQUEOUS ELECTROLYTE ENERGY STORAGE DEVICE

TECHNICAL FIELD

The present invention relates to a nonaqueous electrolyte energy storage device, and a method for manufacturing a nonaqueous electrolyte energy storage device.

BACKGROUND ART

Nonaqueous electrolyte secondary batteries typified by lithium ion secondary batteries are widely used for electronic devices such as personal computers and communication terminals, motor vehicles, and the like since these secondary batteries have a high energy density. The nonaqueous electrolyte secondary batteries generally include a pair of electrodes, which are electrically separated from each other by a separator, and a nonaqueous electrolyte interposed between the electrodes, and are configured to allow ions to be transferred between the two electrodes for charge-discharge. Capacitors such as lithium ion capacitors and electric double-layer capacitors are also widely used as nonaqueous electrolyte energy storage devices other than nonaqueous electrolyte secondary batteries.

In general, the nonaqueous electrolyte of the nonaqueous electrolyte energy storage device contains a nonaqueous solvent and an electrolyte salt dissolved in the nonaqueous solvent. In this nonaqueous electrolyte, various additives and solvents are selected and used for improved performance. For example, Patent Document 1 describes a nonaqueous electrolyte secondary battery with a nonaqueous electrolyte containing a boron-based additive.

In addition, modifying the surfaces of positive active material particles is proposed for suppressing the decomposition of the nonaqueous electrolyte on the positive electrode, the degradation of the positive active material, and the like. For example, Patent Document 2 and Patent Document 3 describe attaching a boron compound to the surfaces of positive active material particles or coating the surfaces with the boron compound.

PRIOR ART DOCUMENTS

Patent Documents

Patent Document 1: JP-A-2015-162304
Patent Document 2: WO 2013/031523 A
Patent Document 3: WO 2015/065046 A

SUMMARY OF THE INVENTION

Problems to be Solved by the Invention

In general, in a nonaqueous electrolyte energy storage device obtained with the use of a nonaqueous electrolyte containing a boron-based additive or a nonaqueous electrolyte energy storage device obtained with the use of a positive active material that has a boron compound attached to particle surfaces or has particle surfaces coated with the boron compound, an ion conductive surface film containing a boron element is formed on the surface of a positive composite layer, and the capacity retention ratio in a charge-discharge cycle is improved. The inventor has, however, found that the nonaqueous electrolyte energy storage devices obtained with the use of the nonaqueous electrolytes may have the disadvantage of a high rate of increase in direct-current resistance after a charge-discharge cycle under high temperature.

The present invention has been made in view of the circumstances as described above, and an object of the present invention is to provide a nonaqueous electrolyte energy storage device capable of reducing the rate of increase in direct-current resistance after a charge-discharge cycle under high temperature, and a manufacturing method therefor.

Means for Solving the Problems

An aspect of the present invention made for solving the problem mentioned above is a nonaqueous electrolyte energy storage device including: a positive electrode including a positive composite layer containing a transition metal oxide and a boron element; a negative electrode; and a nonaqueous electrolyte containing a sulfuric acid ester compound, in which the content of the boron element in the positive composite layer is 0.03% by mass or more.

In addition, another aspect of the present invention made for solving the problem mentioned above is a method for manufacturing a nonaqueous electrolyte energy storage device, including: preparing a positive electrode including a positive composite layer containing a transition metal oxide and a boron element; preparing a negative electrode; and preparing a nonaqueous electrolyte containing a sulfuric acid ester compound, in which the preparing the positive electrode includes providing the positive composite layer containing the boron element such that the content of the boron element in the positive composite layer is 0.03% by mass or more.

Advantages of the Invention

According to the present invention, it is possible to provide a nonaqueous electrolyte energy storage device with the reduced rate of increase in direct-current resistance after a charge-discharge cycle under high temperature, and a manufacturing method therefor.

MODE FOR CARRYING OUT THE INVENTION

Figure 1:
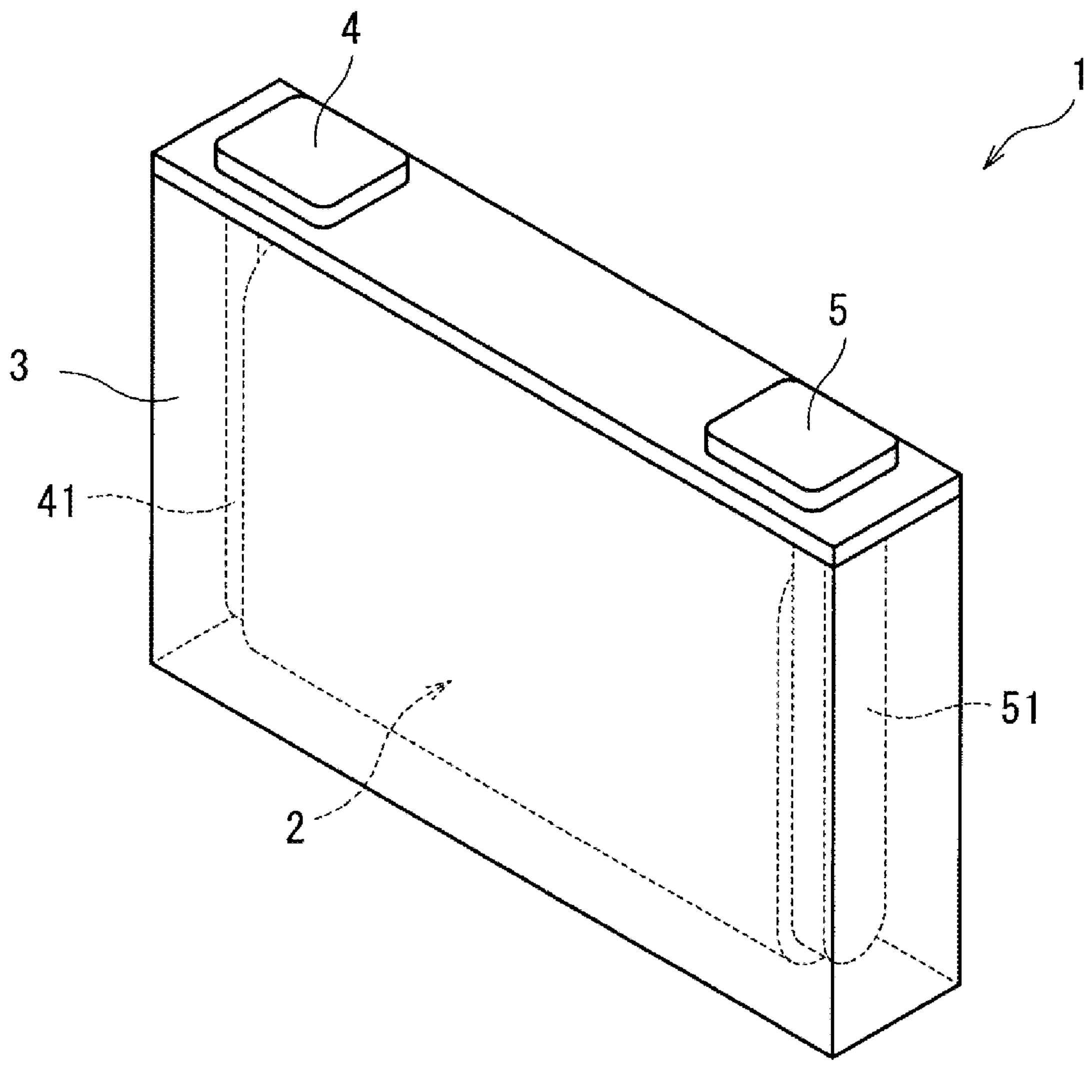
FIG. 1 is an external perspective view illustrating an embodiment of a nonaqueous electrolyte energy storage device.

A nonaqueous electrolyte energy storage device according to an embodiment of the present invention is a nonaqueous electrolyte energy storage device including: a positive electrode including a positive composite layer containing a transition metal oxide and a boron element; a negative electrode; and a nonaqueous electrolyte containing a sulfuric acid ester compound, in which the content of the boron element in the positive composite layer is 0.03% by mass or more.

The nonaqueous electrolyte energy storage device includes the positive composite layer containing a predetermined amount of boron element and the nonaqueous electrolyte containing the sulfuric acid ester compound, thereby making it possible to reduce the rate of increase in direct-current resistance after a charge-discharge cycle under high temperature. The reason for this is not clear but is considered as follows. When the positive composite layer contains a predetermined proportion of boron element, an ion-conductive film containing the boron element is presumed to be formed on the surface of the positive composite layer, thereby allowing the capacity retention ratio in a charge-discharge cycle to be improved. In contrast, repeating charge-discharge under a high-temperature environment is believed to increase the resistance of the film containing the boron element, formed on the surface of the positive composite layer, thereby increasing the direct-current resistance of the nonaqueous electrolyte energy storage device. This increase in battery resistance becomes more remarkable as the amount of the boron element contained in the positive composite layer is increased. In the nonaqueous electrolyte energy storage device, when the nonaqueous electrolyte contains the sulfuric acid ester compound, a low-resistance film containing a decomposition product from the boron element and the sulfuric acid ester compound is presumed to be formed on the surface of the positive composite layer. This film is presumed to have flexibility improved by containing a decomposition product from the boron element and the sulfuric acid ester compound, thereby making the film more likely to follow the expansion and contraction of the positive composite layer due to charge-discharge. Thus, the nonaqueous electrolyte energy storage device is considered capable of reducing the rate of increase in direct-current resistance after a charge-discharge cycle under high temperature. In particular, a nonaqueous electrolyte energy storage device including a positive electrode including a positive composite layer that has a high content of boron element can sufficiently enjoy the advantages of the present invention. It is to be noted that the film containing the decomposition product from the boron element and the sulfuric acid ester compound is preferably formed on the entire surface of each material that forms the positive composite layer, but the effect of the present invention can be produced without any problem even when the film is formed only on a part of the surface or only on a specific material.

In the nonaqueous electrolyte energy storage device, the transition metal oxide preferably contains a nickel element, a cobalt element, and at least one of a manganese element and an aluminum element. Such a nonaqueous electrolyte energy storage device is, with a coating containing a boron element formed on the surface of the positive composite layer, capable of inhibiting the elution or the like of the metal elements contained in this transition metal oxide, thereby improving the capacity retention ratio in a charge-discharge cycle, and resulting in a high capacity. Such a nonaqueous electrolyte energy storage device including the positive composite layer containing the transition metal oxide further includes a nonaqueous electrolyte containing a sulfuric acid ester, thereby allowing a low-resistance film to be formed on the surface of the positive composite layer, and allowing the rate of increase in direct-current resistance after a charge-discharge cycle under high temperature to be further reduced.

A method for manufacturing a nonaqueous electrolyte energy storage device according to an embodiment of the present invention a method for manufacturing a nonaqueous electrolyte energy storage device, including: preparing a positive electrode including a positive composite layer containing a transition metal oxide and a boron element; preparing a negative electrode; and preparing a nonaqueous electrolyte containing a sulfuric acid ester compound, in which the preparing the positive electrode includes providing the positive composite layer containing the boron element such that the content of the boron element in the positive composite layer is 0.03% by mass or more.

The method for manufacturing the nonaqueous electrolyte energy storage device is capable of manufacturing a nonaqueous electrolyte energy storage device with the reduced rate of increase in direct-current resistance after a charge-discharge cycle under high temperature.

Hereinafter, the configuration of a nonaqueous electrolyte energy storage device according to an embodiment of the present invention and a method for manufacturing the nonaqueous electrolyte energy storage device will be described in detail. The names of the respective constituent elements for use in the respective embodiments may be different from the names of the respective elements for use in the background art. The embodiment of the present invention will be described in detail with reference to the drawings as appropriate.

<Configuration of Nonaqueous Electrolyte Energy Storage Device>

The nonaqueous electrolyte energy storage device (hereinafter, simply referred to as an "energy storage device") according to an embodiment of the present invention includes a positive electrode, a negative electrode, and a nonaqueous electrolyte. The positive electrode and the negative electrode usually form an electrode assembly stacked or wound with a separator interposed therebetween. This electrode assembly is housed in a case, and a nonaqueous electrolyte is filled in this case. As the case mentioned above, a known metal case, a resin case or the like, which is usually used as a case of a nonaqueous electrolyte secondary battery can be used. The nonaqueous electrolyte is interposed between the positive electrode and the negative electrode. A nonaqueous electrolyte secondary battery (hereinafter, also simply referred to as a "secondary battery") will be described as an example of the nonaqueous electrolyte energy storage device.

[Positive Electrode]

The positive electrode includes a positive substrate and a positive composite layer. The positive composite layer contains a transition metal oxide and a boron element. The positive composite layer is stacked along at least one surface of the positive substrate directly or with an intermediate layer interposed therebetween.

(Positive Substrate)

The positive substrate is a substrate with conductivity. Having "conductivity" means having a volume resistivity of $10^7$ Ω·cm or less that is measured in accordance with JIS-H-0505 (1975), and the term "non-conductivity" means that the volume resistivity is more than $10^7$ Ω·cm. As the material of the positive substrate, a metal such as aluminum, titanium, tantalum, or stainless steel, or an alloy thereof is used. Among these metals and alloys, aluminum or an aluminum alloy is preferable from the viewpoint of electric potential resistance, high conductivity, and costs. Examples of the form of the positive substrate include a foil and a deposited film, and a foil is preferable from the viewpoint of costs. Accordingly the positive substrate is preferably an aluminum foil or an aluminum alloy foil. Examples of the aluminum or aluminum alloy include A1085, A1N30, A3003, and the like specified in JIS-H-4000 (2014) or JIS-H-4160 (2006).

The average thickness of the positive substrate mentioned above is preferably 3 μm or more and 50 μm or less, more preferably 5 μm or more and 40 μm or less, still more preferably 8 μm or more and 30 μm or less, and particularly preferably 10 μm or more and 25 μm or less. The average thickness of the positive substrate falls within the range mentioned above, thereby making it possible to increase the energy density per volume of a secondary battery while increasing the strength of the positive substrate. The "average thickness" refers to a value obtained by dividing the cutout mass in cutout of a substrate having a predetermined area by the true density and cutout area of the substrate. The same definition applies when the "average thickness" is used for other members and the like.

(Intermediate Layer)

The intermediate layer is a layer disposed between the positive substrate and the positive composite layer. The intermediate layer contains conductive particles such as carbon particles to reduce the contact resistance between the positive substrate and the positive composite layer. The configuration of the intermediate layer is not particularly limited, and includes, for example, a binder and conductive particles.

(Positive Composite Layer)

The positive composite layer is formed from a so-called positive composite containing a positive active material. The positive composite layer contains optional components such as a conductive agent, a binder (binding agent), a thickener, a filler, or the like, if necessary.

The positive composite layer contains a transition metal oxide as the positive active material mentioned above. The transition metal oxide can be appropriately selected from known substances. For the transition metal oxide for use as a positive active material for a lithium ion secondary battery a material capable of storing and releasing lithium ions is typically used. Examples of such a transition metal oxide include lithium transition metal oxides that have an $\alpha$-$NaFeO_2$-type crystal structure and lithium transition metal oxides that have a spinel-type crystal structure. Examples of the lithium transition metal oxides that have an $\alpha$-$NaFeO_2$-type crystal structure include $Li[Li_xNi_{1-x}]O_2$ ($0 \le x < 0.5$), $Li[Li_xNi_\gamma Co_{1-x-\gamma}]O_2$ ($0 \le x < 0.5$, $0 < \gamma < 1$), $Li[Li_xCo_{1-x}]O_2$ ($0 \le x < 0.5$), $Li[Li_xNi_\gamma Mn_{1-x-\gamma}]O_2$ ($0 \le x < 0.5$, $0 < \gamma < 1$), $Li[Li_xNi_\gamma Mn_\beta Co_{1-x-\gamma-\beta}]O_2$ ($0 \le x < 0.5$, $0 < \gamma$, $0 < \beta$, $0.5 < \gamma + \beta < 1$), and $Li[Li_xNi_\gamma Co_\beta Al_{1-x-\gamma-\beta}]O_2$ ($0 \le x < 0.5$, $0 < \gamma$, $0 < \beta$, $0.5 < \gamma + \beta < 1$). Examples of the lithium transition metal oxides that have a spinel-type crystal structure include $Li_xMn_2O_4$ and $Li_xNi_\gamma Mn_{2-\gamma}O_4$. Some of the atoms in these materials may be substituted with atoms composed of other elements. In the positive composite layer, one of these materials may be used singly or two or more thereof may be used in mixture.

The transition metal oxide preferably contains a nickel element, a cobalt element, and at least one of a manganese element and an aluminum element. The transition metal oxide more preferably has an $\alpha$-$NaFeO_2$-type crystal structure. Such a substance is selected as the transition metal oxide, thereby making it possible to provide a nonaqueous electrolyte energy storage device with a high capacity and with the reduced rate of increase in direct-current resistance after a charge-discharge cycle under high temperature.

The content of the transition metal oxide in the positive composite layer is preferably 50% by mass or more and 99% by mass or less, more preferably 70% by mass or more and 98% by mass or less, still more preferably 80% by mass or more and 95% by mass or less. The content of the transition metal oxide falls within the range mentioned above, thereby making it possible to achieve a balance between the increased energy density and productivity of the positive composite layer.

The positive active material mentioned above is usually particles (powder). The average particle size of the positive active material is preferably 0.1 μm or more and 20 μm or less, for example. By setting the average particle size of the positive active material to be equal to or more than the above lower limit, the positive active material is easily manufactured or handled. By setting the average particle size of the positive active material to be equal to or less than the upper limit, the electron conductivity of the positive composite layer is improved. It is to be noted that in the case of using a composite of the transition metal oxide mentioned above and another material as the positive active material, the average particle size of the composite is regarded as the average particle size of the positive active material. The term "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

A crusher or a classifier is used to obtain a powder having a predetermined particle size. Examples of a crushing method include a method in which a mortar, a ball mill, a sand mill, a vibratory ball mill, a planetary ball mill, a jet mill, a counter jet mill, a whirling airflow type jet mill, or a sieve or the like is used. At the time of crushing, wet type crushing in the presence of water or an organic solvent such as hexane can also be used. As a classification method, a sieve or a wind force classifier or the like is used based on the necessity both in dry manner and in wet manner.

The positive composite layer mentioned above contains a boron element. The content of the boron element in the positive composite layer is 0.03% by mass or more. The content of the boron element falls within the range mentioned above, thereby allowing the rate of increase in direct-current resistance after a charge-discharge cycle under high temperature to be reduced when the nonaqueous electrolyte contains therein the sulfuric acid ester compound. The lower limit of the content of the boron element is preferably 0.04% by mass, more preferably 0.08% by mass. The upper limit of the content of the boron element is not particularly limited, but is preferably 0.17% by mass, more preferably 0.15% by mass, still more preferably 0.10% by mass from the viewpoint of reducing the initial direct-current resistance.

Examples of the method for providing the positive composite layer containing a boron element include a method of mixing a positive composite with a boron compound, a method of adding a boron element to particles the transition metal oxide or coating the particles with a boron element, and a method of adding a boron-based additive to a nonaqueous electrolyte. As the method for providing the positive composite layer containing a boron element, a single method may be used, or multiple methods may be used in combination.

The boron compound is not particularly limited as long as the boron compound is a compound containing a boron element, and examples thereof include a boric acid, a boron oxide, a lithium tetraborate, and an ammonium borate. The positive composite and the boron compound are mixed and subjected to a heat treatment, if necessary thereby allowing the above-mentioned positive composite layer containing a boron element. In addition, the boron-containing particles obtained by the above-described method of adding a boron element to the transition metal oxide particles or coating the particles with a boron element can be used as a positive active material. Examples of such boron-containing particles include particles of $LiNi_xCo_yMn_zB_\alpha O_2$ and particles where a coating layer containing a boron element is formed on the surface of a lithium-nickel-cobalt-manganese composite oxide.

Examples of the boron-based additive mentioned above include boron-containing lithium salts such as a lithium bisoxalate borate, a lithium difluoroxalate borate, and a lithium tetrafluoroborate, borate esters such as a trimethyl borate, and boroxine compounds. The boron-based additives may be used singly or may be used in combination. The nonaqueous electrolyte energy storage device in which the boron-based additive is added to the nonaqueous electrolyte is subjected to charge-discharge at least one time, a film containing a boron element can be formed on the surface of the positive composite layer.

The conductive agent mentioned above is not particularly limited as long as the agent is a material exhibiting conductivity. Examples of such a conductive agent include carbonaceous materials, metals, and conductive ceramics. Examples of the carbonaceous materials include graphitized carbon, non-graphitized carbon, and graphene-based carbon. Examples of the non-graphitized carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent mentioned above include a powdery shape and a fibrous shape. As the conductive agent, one of these materials may be used singly or two or more thereof may be used in mixture. These materials may be composited and then used. For example, a material obtained by compositing carbon black with CNT may be used. Among these materials, carbon black is preferable from the viewpoint of electron conductivity and coatability, and among the carbon black, acetylene black is preferable.

The content of the conductive agent in the positive composite layer is preferably 1% by mass or more and 10% by mass or less, more preferably 3% by mass or more and 9% by mass or less. The content of the conductive agent falls within the range mentioned above, thereby allowing the energy density of the secondary battery to be increased.

Examples of the binder mentioned above include: thermoplastic resins such as fluororesin (polytetrafluoroethylene (PTFE), polyvinylidene fluoride (PVDF), etc.), polyethylene, polypropylene, polyacryl, and polyimide; elastomers such as an ethylene-propylene-diene rubber (EPDM), sulfonated EPDM, a styrene butadiene rubber (SBR), and a fluororubber; and polysaccharide polymers.

The content of the binder in the positive composite layer mentioned above is preferably 1% by mass or more and 10% by mass or less, and more preferably 3% by mass or more and 9% by mass or less. The content of the binder falls within the range mentioned above, thereby allowing the active material to be stably held.

Examples of the thickener include polysaccharide polymers such as carboxymethylcellulose (CMC) and methylcellulose. When the thickener mentioned above has a functional group that is reactive with lithium and the like, the functional group may be deactivated by methylation or the like in advance.

The filler is not particularly limited. Examples of the filler include polyolefins such as polypropylene and polyethylene, inorganic oxides such as silicon dioxide, alumina, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, and barium sulfate, nitrides such as aluminum nitride and silicon nitride, and substances derived from mineral resources, such as talc, montmorillonite, boehmite, zeolite, apatite, kaolin, mullite, spinel, olivine, sericite, bentonite and mica, or artificial products thereof.

The positive composite layer may contain a typical nonmetal element such as N, P, F, Cl, Br, or I, a typical metal element such as Li, Na, Mg, Al, K, Ca, Zn, Ga, Ge, Sn, Sr, and Ba or a transition metal element such as Sc, Ti, V Cr, Mn, Fe, Co, Ni, Cu, Mo, Zr, Nb, or W as a component other than the positive active material, the conductive agent, the binder, the thickener, and the filler.

[Negative Electrode]

The negative electrode includes a negative substrate and a negative composite layer. The negative composite layer contains a negative active material. The negative composite layer is laminated along at least one surface of the negative substrate directly or indirectly with an intermediate layer interposed therebetween.

(Negative Substrate)

The negative substrate has conductivity. As the material of the negative substrate, a metal such as copper, nickel, stainless steel, nickel-plated steel, or aluminum, or an alloy thereof is used. Among these metals and alloys, copper or a copper alloy is preferable. Examples of the form of the negative substrate include a foil and a vapor deposited film, and a foil is preferable from the viewpoint of cost. Accordingly the negative substrate is preferably a copper foil or a copper alloy foil. Examples of the copper foil include a rolled copper foil and an electrolytic copper foil.

The average thickness of the negative substrate mentioned above is preferably 2 μm or more and 35 μm or less, more preferably 3 μm or more and 30 μm or less, still more preferably 4 μm or more and 25 μm or less, particularly preferably 5 μm or more and 20 μm or less. The average thickness of the negative substrate falls within the above-mentioned range, thereby making it possible to increase the energy density per volume of the secondary battery while increasing the strength of the negative substrate.

(Negative Active Material Layer)

The negative active material layer mentioned above includes a negative active material. The negative active material layer contains optional components such as a conductive agent, a binder, a thickener, and a filler, if necessary. The optional components such as a conductive agent, a binder, a thickener, and a filler can be selected from the materials exemplified for the positive electrode.

The negative active material layer mentioned above may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials. As the negative active material for a lithium ion secondary battery a material capable of absorbing and releasing lithium ions is usually used. Examples of the negative active material include metal Li; metals or metalloids such as Si and Sn; metal oxides or metalloid oxides such as a Si oxide, a Ti oxide, and a Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, a negative active material containing graphite is preferably used. With the selection of, as the negative active material mentioned above, a negative active material containing graphite, a favorable film is also formed on the negative electrode side, thereby making it possible to provide a nonaqueous electrolyte energy storage device with a high capacity and with the reduced rate of increase in direct-current resistance after a charge-discharge cycle under high temperature. Non-graphitic carbon is also preferably used as the negative active material. The use of non-graphitic carbon as the negative active material allows the direct-current resistance of the nonaqueous electrolyte energy storage device to be reduced, thus making it possible to provide a nonaqueous electrolyte energy storage device that is low in direct-current resistance after a charge-discharge cycle at an initial stage and under high temperature. Further, in the negative active material layer, one of these materials may be used singly, or two or more thereof may be used in mixture.

The term "graphite" refers to a carbon material in which an average lattice spacing ($d_{002}$) of the (002) plane determined by an X-ray diffraction method before charge-discharge or in a discharged state is 0.33 nm or more and less than 0.34 nm. Examples of the graphite include natural graphite and artificial graphite. Artificial graphite is preferable from the viewpoint that a material having stable physical properties can be obtained.

The term "non-graphitic carbon" refers to a carbon material in which the average lattice spacing ($d_{002}$) of the (002) plane determined by the X-ray diffraction method before charge-discharge or in the discharged state is 0.34 nm or more and 0.42 nm or less. Examples of the non-graphitic carbon include hardly graphitizable carbon and easily graphitizable carbon. Examples of the non-graphitic carbon include a resin-derived material, a petroleum pitch or a material derived from petroleum pitch, a petroleum coke or a material derived from petroleum coke, a plant-derived material, and an alcohol derived material.

In this regard, the "discharge state" refers to a state where an open circuit voltage is 0.7 V or more in a half cell using a negative electrode, containing a carbon material as a negative active material as a working electrode and using metal Li as a counter electrode. Since the potential of the metal Li counter electrode in an open circuit state is substantially equal to an oxidation/reduction potential of Li, the open circuit voltage in the half cell is substantially equal to the potential of the negative electrode containing the carbon material with respect to the oxidation/reduction potential of Li. More specifically the fact that the open circuit voltage in the half cell is 0.7 V or more means that lithium ions that can be occluded and released in association with charge-discharge are sufficiently released from the carbon material that is the negative active material.

The "hardly graphitizable carbon" refers to a carbon material in which the $d_{002}$ is 0.36 nm or more and 0.42 nm or less.

The "easily graphitizable carbon" refers to a carbon material in which the $d_{002}$ is 0.34 nm or more and less than 0.36 nm.

The negative active material mentioned above is typically particles (powder). The average particle size of the negative active material can be, for example, 1 nm or more and 100 μm or less. When the negative active material is, for example, a carbon material, the average particle size thereof may be preferably 1 μm or more and 100 μm or less. When the negative active material is a metal, a metalloid, a metal oxide, a metalloid oxide, a titanium-containing oxide, a polyphosphoric acid compound or the like, the average particle size thereof may be preferably 1 nm or more and 1 μm or less. By setting the average particle size of the negative active material to be equal to or greater than the lower limit, the negative active material is easily produced or handled. By setting the average particle size of the negative active material to be equal to or less than the upper limit, the electron conductivity of the negative active material layer is improved. A crusher or a classifier is used to obtain a powder having a predetermined particle size. A crushing method and a powder classification method can be selected from, for example, the methods exemplified for the positive electrode.

The content of the negative active material in the negative active material layer mentioned above is preferably 60% by mass or more and 99% by mass or less, more preferably 90% by mass or more and 98% by mass or less. The content of the negative active material falls within the range mentioned above, thereby making it possible to achieve a balance between the increased energy density and productivity of the negative active material layer.

[Separator]

The separator mentioned above can be appropriately selected from known separators. As the separator, for example, a separator composed of only a substrate layer, a separator in which a heat resistant layer containing heat resistant particles and a binder is formed on one surface or both surfaces of the substrate layer, or the like can be used. Examples of the form of the substrate layer of the separator include a woven fabric, a nonwoven fabric, and a porous resin film. Among these forms, a porous resin film is preferable from the viewpoint of strength, and a nonwoven fabric is preferable from the viewpoint of liquid retaining property of the nonaqueous electrolyte. As the material of the substrate layer of the separator, a polyolefin such as polyethylene or polypropylene is preferable from the viewpoint of a shutdown function, and polyimide, aramid or the like is preferable from the viewpoint of resistance to oxidation and decomposition. As the substrate layer of the separator, a material obtained by combining these resins may be used.

Examples of the heat resistant particles included in the heat resistant layer mentioned above include inorganic compounds. Examples of such inorganic compound include: oxides such as iron oxide, silicon oxide, aluminum oxide, titanium dioxide, zirconium oxide, calcium oxide, strontium oxide, barium oxide, magnesium oxide, and aluminosilicate; hydroxides such as magnesium hydroxide, calcium hydroxide, and aluminum hydroxide; nitrides such as aluminum nitride and silicon nitride; carbonates such as calcium carbonate; sulfates such as barium sulfate; hardly soluble ionic crystals such as calcium fluoride, barium fluoride, and barium titanate; covalently bonded crystals such as silicon and diamond; and substances derived from mineral resources, such as talc, montmorillonite, boehmite, zeolite, apatite, kaolin, mullite, spinel, olivine, sericite, bentonite and mica, and artificial products thereof. As such inorganic compounds, a simple substance or a complex of these substances may be used alone, or two or more thereof may be used in mixture. Among these inorganic compounds, silicon oxide, aluminum oxide, or aluminosilicate is preferable from the viewpoint of safety of the energy storage device.

The porosity of the separator mentioned above is preferably 80% by volume or less from the viewpoint of strength, and is preferably 20% by volume or more from the viewpoint of discharge performance. The "porosity" herein is a volume-based value, and means a value measured with a mercury porosimeter.

As the separator, a polymer gel composed of a polymer and a nonaqueous electrolyte may be used. Examples of the polymer include polyacrylonitrile, polyethylene oxide, polypropylene oxide, polymethyl methacrylate, polyvinyl acetate, polyvinylpyrrolidone, and polyvinylidene fluoride. The use of the polymer gel has the effect of suppressing liquid leakage. As the separator, a polymer gel may be used in combination with a porous resin film, a nonwoven fabric, or the like as described above.

[Nonaqueous Electrolyte]

The nonaqueous electrolyte mentioned above typically includes a nonaqueous solvent, an electrolyte salt dissolved in the nonaqueous solvent, and an additive. In the nonaqueous electrolyte energy storage device according to an embodiment of the present invention, the nonaqueous electrolyte contains a sulfuric acid ester compound as the additive. In this specification, a solution obtained by dissolving an electrolyte salt in a nonaqueous solvent may be referred to as a "nonaqueous solution" in some cases.

(Nonaqueous Solvent)

The nonaqueous solvent mentioned above can be appropriately selected from known nonaqueous solvents. Examples of the nonaqueous solvent include cyclic carbonates, chain carbonates, carboxylic acid esters, phosphoric acid esters, sulfonic acid esters, ethers, amides, and nitriles. As the nonaqueous solvent, solvents in which some hydrogen atoms contained in these compounds are substituted with halogen may be used.

Examples of the cyclic carbonate include ethylene carbonate (EC), propylene carbonate (PC), butylene carbonate (BC), chloroethylene carbonate, fluoroethylene carbonate (FEC), and difluoroethylene carbonate (DFEC). Among these examples, EC and PC are preferable.

Examples of the chain carbonate include diethyl carbonate (DEC), dimethyl carbonate (DMC), ethyl methyl carbonate (EMC), diphenyl carbonate, trifluoroethyl methyl carbonate, and bis(trifluoroethyl)carbonate. Among these examples, EMC is preferable.

As the nonaqueous solvent mentioned above, it is preferable to use the cyclic carbonate or the chain carbonate, and it is more preferable to use the cyclic carbonate and the chain carbonate in combination. The use of the cyclic carbonate allows the promoted dissociation of the electrolyte salt to improve the ionic conductivity of the nonaqueous electrolyte. The use of the chain carbonate allows the viscosity of the nonaqueous electrolyte solution to be kept low. When the cyclic carbonate and the chain carbonate are used in combination, the volume ratio of the cyclic carbonate to the chain carbonate (cyclic carbonate:chain carbonate) preferably falls within the range from 5:95 to 50:50, for example.

(Electrolyte Salt)

The electrolyte salt mentioned above can be appropriately selected from known electrolyte salts. Examples of the electrolyte salt include a lithium salt, a sodium salt, a potassium salt, a magnesium salt, and an onium salt. Among these salts, the lithium salt is preferable.

Examples of the lithium salt include inorganic lithium salts such as $LiPF_6$, $LiBF_4$, $LiClO_4$, and $LiN(SO_2F)_2$, and lithium salts having a halogenated hydrocarbon group, such as $LiSO_3CF_3$, $LiN(SO_2CF_3)_2$, $LiN(SO_2C_2F_5)_2$, $LiN(SO_2CF_3)(SO_2C_4F)$, $LiC(SO_2CF_3)_3$, and $LiC(SO_2C_2F_5)_3$. Among these salts, the inorganic lithium salts are preferable, and $LiPF_6$ is more preferable.

The content of the electrolyte salt in the nonaqueous electrolyte solution is preferably 0.1 mol/dm$^3$ or more and 2.5 mol/dm$^3$ or less, more preferably 0.3 mol/dm$^3$ or more and 2.0 mol/dm$^3$ or less, still more preferably 0.5 mol/dm$^3$ or more and 1.7 mol/dm$^3$ or less, particularly preferably 0.7 mol/dm$^3$ or more and 1.5 mol/dm$^3$ or less. The content of the electrolyte salt falls within the range mentioned above, thereby allowing the ionic conductivity of the nonaqueous electrolyte to be increased.

(Sulfuric Acid Ester Compound)

The nonaqueous electrolyte contains a sulfuric acid ester compound. When the nonaqueous electrolyte contains a sulfuric acid ester compound, a low-resistance film containing a decomposition product from the boron element and the sulfuric acid ester compound is presumed to be formed on the surface of the positive composite layer. Thus, the flexibility of the film formed on the surface of the positive composite layer is presumed to be improved, thereby making the film more likely to follow the expansion and contraction of the positive electrode due to charge-discharge, and allowing the nonaqueous electrolyte energy storage device to suppress an increase in direct-current resistance after a charge-discharge cycle under high temperature. When the nonaqueous electrolyte contains a sulfuric acid ester compound, the initial direct-current resistance can be also reduced. In addition, the sulfuric acid ester compound has stability to moisture and the like, and thus has a low possibility of producing an acid in the process of a charge-discharge cycles, thereby affecting the positive active material, the film formed on the positive composite layer, and the like.

The sulfuric acid ester compound is not particularly limited, and examples thereof include a chain sulfuric acid ester compound and a cyclic sulfuric acid ester compound. Examples of the chain sulfuric acid ester compound include a compound represented by the following formula (1). Examples of the cyclic sulfuric acid ester compound include a compound represented by the following formula (2).

[Chemical Formula 1]

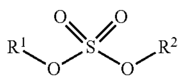

(1)

In the formula (1), $R^1$ and $R^2$ each independently represent an alkyl group having 1 to 4 carbon atoms, a halogenated alkyl group having 1 to 4 carbon atoms, an alkoxyalkyl group having 1 to 4 carbon atoms, a sulfonyloxyalkyl group having 1 to 4 carbon atoms, or an alkyl group having 2 to 6 carbon atoms, which has a cyclic sulfate structure.

[Chemical Formula 2]

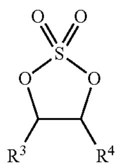

(2)

In the formula (2), $R^3$ and $R^4$ each independently represent a hydrogen atom, a halogen atom, an alkyl group having 1 to 4 carbon atoms, a halogenated alkyl group having 1 to 4 carbon atoms, an alkoxyalkyl group having 1 to 4 carbon atoms, a sulfonyloxyalkyl group having 1 to 4 carbon atoms, or an alkyl group having 2 to 6 carbon atoms, which has a cyclic sulfate structure.

Specific examples of the halogen atom in the formula (1) and the formula (2) include a fluorine atom, a chlorine atom, a bromine atom, and an iodine atom. The halogen atom is preferably a fluorine atom. The "alkyl group having 1 to 4 carbon atoms" is a linear or branched alkyl group having 1 to 4 carbon atoms, and examples thereof include a methyl group, an ethyl group, a propyl group, an isopropyl group, a butyl group, an isobutyl group, a sec-butyl group, and a tert-butyl group. The "halogenated alkyl group having 1 to 4 carbon atoms" is a group where some or all of hydrogen atoms of the alkyl group having 1 to 4 carbon atoms are substituted with halogen atoms, and examples thereof include a monofluoromethyl group, a difluoromethyl group, a trifluoromethyl group, a 2,2,2-trifluoroethyl group, and a perfluoroethyl group. The "alkoxyalkyl group having 1 to 4 carbon atoms" is a group where some of hydrogen atoms of the alkyl group having 1 to 4 carbon atoms are substituted with a linear or branched alkoxy group having 1 to 4 carbon atoms, and examples of the alkoxy group include a methoxy group, an ethoxy group, a propoxy group, a butoxy group, an isopropoxy group, a sec-butoxy group, and a tert-butoxy group.

In the formula (1) and the formula (2), the "sulfonyloxyalkyl group having 1 to 4 carbon atoms" is a group where some of hydrogen atoms of the alkyl group having 1 to 4 carbon atoms are substituted with a sulfonyloxy group. Examples of the sulfuric acid ester compound containing a sulfonyloxyalkyl group include a compound represented by the following formula (3). The "cyclic sulfate structure" refers to a cyclic sulfuric acid ester structure, and the "alkyl group having 2 to 6 carbon atoms, which has a cyclic sulfate structure" refers to an alkyl group having 2 to 6 carbon atoms, where some of hydrogen atoms are substituted to constitute a cyclic sulfate structure. Examples of the sulfuric acid ester compound containing the alkyl group having 2 to 6 carbon atoms, which has a cyclic sulfate structure include a compound represented by the following formula (4). The sulfuric acid ester compound is preferably a compound represented by the following formula (3) or a compound represented by the following formula (4) from the viewpoint of stability.

[Chemical Formula 3]

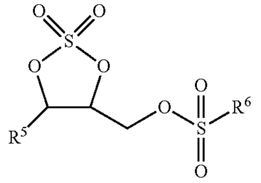

(3)

In the formula (3), $R^5$ represents a hydrogen atom, a halogen atom, an alkyl group having 1 to 4 carbon atoms, or a halogenated alkyl group having 1 to 4 carbon atoms. $R^6$ represents a halogen atom, an alkyl group having 1 to 4 carbon atoms, a halogenated alkyl group having 1 to 4 carbon atoms, or an alkoxy group having 1 to 4 carbon atoms.

[Chemical Formula 4]

(4)

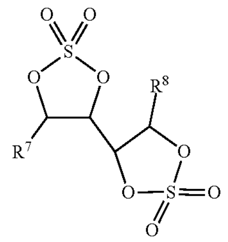

In the formula (4), $R^7$ and $R^8$ each independently represent a hydrogen atom, a halogen atom, an alkyl group having 1 to 4 carbon atoms, or a halogenated alkyl group having 1 to 4 carbon atoms.

Examples of the halogen atom, alkyl group having 1 to 4 carbon atoms, or halogenated alkyl group having 1 to 4 carbon atoms represented by $R^5$ and $R^6$ in the formula (3) and $R^7$ and $R^8$ in the formula (4), include groups that are similar to the groups exemplified as the hydrogen atom, halogen atom, alkyl group having 1 to 4 carbon atoms, or halogenated alkyl group having 1 to 4 carbon atoms represented by $R^3$ in the formula (2).

The "alkoxy group having 1 to 4 carbon atoms" represented by $R^6$ in the formula (3) is a linear or branched alkoxy group having 1 to 4 carbon atoms, and examples thereof include a methoxy group, an ethoxy group, a propoxy group, a butoxy group, an isopropoxy group, a sec-butoxy group, and a tert-butoxy group.

Specific examples of the chain sulfuric acid ester compound include a dimethyl sulfate, a diethyl sulfate, a dipropyl sulfate, and a dibutyl sulfate. Among these examples, the dimethyl sulfate is preferable from the viewpoints of stability and price.

Specific examples of the cyclic sulfuric acid ester compound include an ethylene sulfate, 4-fluoro-2,2-dioxo-1,3,2-dioxathiolane, 4,5-difluoro-2,2-dioxo-1,3,2-dioxathiolane, a propylene glycol sulfate, a butylene glycol sulfate, a pentene glycol sulfate, 4-5, dimethyl-dioxo-1,3,2-dioxathiolane, 4-fluorosulfonyloxymethyl-2,2-dioxo-1,3,2-dioxathiolane, 4-methylsulfonyloxymethyl-2,2-dioxo-1,3,2-dioxathiolane, 4-ethylsulfonyloxymethyl-2,2-dioxo-1,3,2-dioxathiolane, 4-trifluoromethylsulfonyloxymethyl-2,2-dioxo-1,3,2-dioxathiolane, 4-methylsulfonyloxymethyl-5-fluoro-2,2-dioxo-1,3,2-dioxathiolane, 4-methylsulfonyloxymethyl-5-methyl-2,2-dioxo-1,3,2-dioxathiolane, 4,4'-bis(2,2-dioxo-1,3,2-dioxathiolane), 4,4'-bis(5-fluoro-2,2-dioxo-1,3,2-dioxathiolane), 4,4'-bis(5-methyl-2,2-dioxo-1,3,2-dioxathiolane), and 4,4'-bis(5-ethyl-2,2-dioxo-1,3,2-dioxathiolane). Among these examples, the ethylene sulfate, 4-methylsulfonyloxymethyl-2,2-dioxo-1,3,2-dioxathiolane, or 4,4'-bis(2,2-dioxo-1,3,2-dioxathiolane) is preferable from the viewpoint of forming a stable film.

As the cyclic sulfuric acid ester compound, a trimethylene sulfate, a derivative thereof, or the like can be used besides the compound represented by the formula (2).

The lower limit of the content of the sulfuric acid ester compound in the nonaqueous electrolyte is preferably 0.01% by mass, more preferably 0.02% by mass, still more preferably 0.1% by mass. The upper limit of the content of the sulfuric acid ester compound is preferably 5.0% by mass, more preferably 3.0% by mass, still more preferably 2.0% by mass. The content of the sulfuric acid ester compound falls within the range mentioned above, thereby allowing the further reduced rate of increase in the direct-current resistance of the nonaqueous electrolyte energy storage device after a charge-discharge cycle under high temperature. In this regard, the "content of the sulfuric acid ester compound" means the mass of the sulfuric acid ester compound with respect to the mass of the nonaqueous solution. When multiple types of sulfuric acid ester compounds are contained, the content of the sulfuric acid ester compound means the total mass of the multiple sulfuric acid ester compounds with respect to the mass of the nonaqueous solution.

The nonaqueous electrolyte preferably further contains a fluorophosphate having a P—O bond. Examples of the fluorophosphate include a lithium monofluorophosphate, a lithium difluorophosphate, a lithium tetrafluorophosphate, a sodium difluorophosphate, and a lithium bisoxalato difluorophosphate. The nonaqueous electrolyte further contains the fluorophosphate, thereby allowing the further reduced rate of increase in the direct-current resistance of the nonaqueous electrolyte energy storage device after a charge-discharge cycle under high temperature. A film containing a phosphorus element and/or a fluorine element in addition to the boron element and the decomposition product from the sulfuric acid ester compound is presumed to be formed.

The lower limit of the content of the fluorophosphate in the nonaqueous electrolyte is preferably 0.01% by mass, more preferably 0.10% by mass, still more preferably 0.30% by mass. The upper limit of the content of the fluorophosphate is preferably 2.00% by mass, more preferably 1.00% by mass, still more preferably 0.70% by mass. The content of the fluorophosphate falls within the range mentioned above, thereby allowing the further reduced rate of increase in the direct-current resistance of the nonaqueous electrolyte energy storage device after a charge-discharge cycle under high temperature. It is to be noted that the content of the fluorophosphate means the mass of the fluorophosphate with respect to the mass of the nonaqueous solution. When multiple types of fluorophosphates are contained, the content of the fluorophosphate means the total mass of the multiple fluorophosphates with respect to the mass of the nonaqueous solution.

The nonaqueous electrolyte preferably further contains a compound that has the function of protecting the negative electrode. As the compound that has the function of protecting the negative electrode, a known compound is used, and for example, a cyclic carbonate with a carbon-carbon unsaturated bond is preferable. Examples of the cyclic carbonate with a carbon-carbon unsaturated bond include a vinylene carbonate (VC), a vinylethylene carbonate (VEC), a styrene carbonate, a 1-phenylvinylene carbonate, include a 1,2-diphenylvinylene carbonate. Among these examples, VC is preferable.

(Other Additives)

The nonaqueous electrolyte may contain, as other additives, components other than the respective compounds described above. Examples of such other components include aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; succinic anhydride, glutaric anhydride, maleic anhydride, citraconic anhydride, glutaconic anhydride, itaconic anhydride, and cyclohexanedicarboxylic anhydride; thioanisole, diphenyl disulfide, dipyridinium disulfide, perfluorooctane, tristrimethylsilyl borate, tristrimethylsilyl phosphate, and tetrakistrimethylsilyl titanate. One of the other components may be used singly, or two or more thereof may be used in mixture. The content of these other components is preferably 5% by mass or less, and more preferably 1% by mass or less.

The shape of the nonaqueous electrolyte energy storage device according to the present embodiment is not particularly limited, and examples thereof include cylindrical batteries, prismatic batteries, flat batteries, coin batteries and button batteries. FIG. 1 shows a nonaqueous electrolyte energy storage device 1 as an example of a prismatic battery. FIG. 1 is a view showing an inside of a case in a perspective manner. An electrode assembly 2 having a positive electrode and a negative electrode which are wound with a separator interposed therebetween is housed in a prismatic case 3. The positive electrode is electrically connected to a positive electrode terminal 4 through a positive electrode lead 41. The negative electrode is electrically connected to a negative electrode terminal 5 via a negative electrode lead 51.

<Configuration of Nonaqueous Electrolyte Energy Storage Apparatus>

Figure 2:
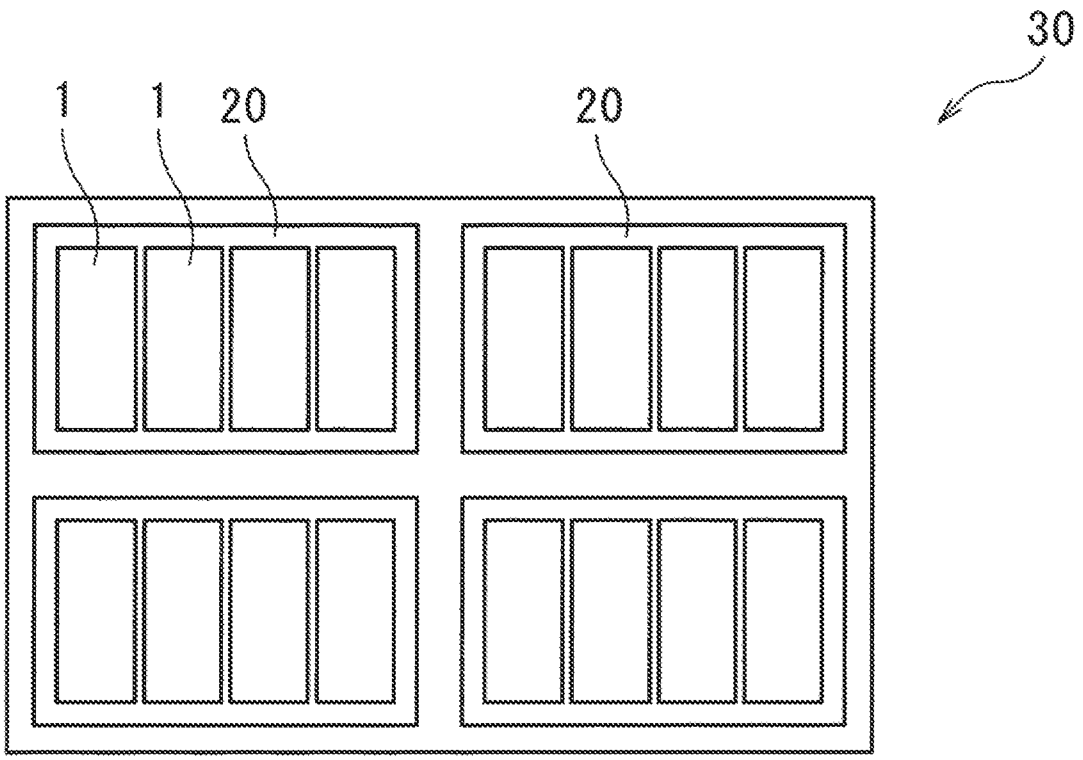
FIG. 2 is a schematic diagram showing an embodiment of an energy storage apparatus including a plurality of nonaqueous electrolyte energy storage devices.

The nonaqueous electrolyte energy storage device according to the present embodiment can be mounted as an energy storage unit (battery module) configured by assembling a plurality of energy storage devices 1 on a power source for automobiles such as electric vehicles (EV), hybrid vehicles (HEV), and plug-in hybrid vehicles (PHEV), a power source for electronic devices such as personal computers and communication terminals, or a power source for power storage, or the like. In this case, the technique of the present invention may be applied to at least one nonaqueous electrolyte energy storage device included in the energy storage unit. FIG. 2 shows an example of an energy storage apparatus 30 formed by assembling energy storage units 20 in each of which two or more electrically connected nonaqueous electrolyte energy storage devices 1 are assembled. The energy storage apparatus 30 may include a busbar (not illustrated) for electrically connecting two or more nonaqueous electrolyte energy storage devices 1 and a busbar (not illustrated) for electrically connecting two or more energy storage units 20. The energy storage unit 20 or the energy storage apparatus 30 may include a state monitor (not illustrated) that monitors the state of one or more nonaqueous electrolyte energy storage devices.

<Method for Manufacturing Nonaqueous Electrolyte Energy Storage Device>

A method for manufacturing a nonaqueous electrolyte energy storage device according to an embodiment of the present invention includes: preparing a positive electrode including a positive composite layer containing a transition metal oxide and a boron element (hereinafter, also referred to as a "positive electrode preparation step"); preparing a negative electrode (hereinafter, also referred to as a "negative electrode preparation step"); and preparing a nonaqueous electrolyte containing a sulfuric acid ester compound (hereinafter, also referred to as a "nonaqueous electrolyte preparation step"), in which the preparing the positive electrode includes providing the positive composite layer containing the boron element such that the content of the boron element in the positive composite layer is 0.03% by mass or more.

[Positive Electrode Preparation Step]

In the positive electrode preparation step, a positive electrode including a positive composite layer containing a transition metal oxide and a boron element can be prepared by a known method. For example, the positive electrode can be obtained by laminating the positive composite layer directly on a positive substrate or laminating the positive composite layer on the positive substrate with an intermediate layer interposed therebetween. The positive composite layer is laminated, for example, by applying a positive composite paste to the positive substrate. The positive composite paste can be adjusted by mixing a positive active material containing a transition metal oxide with a binder or the like as an optional component. The positive composite paste may include a dispersion medium. As the dispersion medium, an organic solvent can be used, such as N-methylpyrrolidone, acetone, ethanol, or toluene. The method for applying the positive composite paste is not particularly limited, and the positive composite paste can be applied by a known method such as roller coating, screen coating, or spin coating.

(Providing Positive Composite Layer Containing a Boron Element)

The positive electrode preparation step includes providing the positive composite layer containing a boron element such that the content of the boron element in the positive composite layer is 0.03% by mass or more. Examples of the providing the positive composite layer containing a boron element include mixing a positive composite paste and a boron compound, using, as a positive active material, boron-containing particles obtained by adding the boron element to particles of the transition metal oxide or coating the particles with a boron element, and bringing the positive electrode into contact with a nonaqueous electrolyte that has a boron-based additive added. The providing the positive composite layer containing a boron element may include a single step or multiple steps for providing the positive composite layer containing the boron element. The content of the boron element in the positive composite layer can be quantified by, for example, inductively coupled plasma emission spectrometry or the like.

The above-described mixing the positive composite paste and the boron compound can be performed by, for example, blending a boron compound into the positive composite paste by a known method. The boron compound is not particularly limited as long as the boron compound is a compound containing a boron element, and examples thereof include a boric acid, a boron oxide, a lithium tetraborate, and an ammonium borate. The mixing the positive composite paste and the boron compound includes leaving to stand and performing a heat treatment, if necessary thereby allowing the positive composite layer to contain a boron element.

The above-described boron-containing particles with a boron element added to the particles of the transition metal oxide or with the particles coated with a boron element can be prepared by a known method. Examples of the boron-containing particles include particles of $LiNi_xCo_yMn_zB_\alpha O_2$ and particles that have a boron element-containing coating layer formed on the surface of a lithium-nickel-cobalt-manganese composite oxide. The positive composite paste is, for example, prepared with the use of the boron-containing particles as the positive active material, thereby allowing the positive electrode mixture layer to contain a boron element.

The above-described adding the boron-based additive to the nonaqueous electrolyte can be performed by, for example, dissolving the boron-based additive in the nonaqueous electrolyte by a known method. The boron-based additive is not particularly limited as long as a film containing a boron element is formed on the surface of the positive composite layer, and for example, boron-containing lithium salts such as a lithium bisoxalate borate, a lithium difluoroxalate borate, and a lithium tetrafluoroborate, boric acid esters such as a trimethyl borate, and boroxine compounds can be used. The nonaqueous electrolyte energy storage device in which the boron-based additive is added to the nonaqueous electrolyte is subjected to charge-discharge at least one time, thereby allowing the positive composite layer to contain a boron element. Further, in order for the content of the boron element in the positive composite layer to be 0.03% by mass or more, the content of the boron-based additive contained in the nonaqueous electrolyte is preferably 2.0% by mass or more, more preferably 3.0% by mass or more. The ratio of the mass of the boron-based additive contained in the nonaqueous electrolyte to the mass of the positive active material contained in the positive composite layer is preferably 1.6% by mass or more, more preferably 2.0% by mass or more. The content of the boron-based additive contained in the nonaqueous electrolyte and the ratio of the mass of the boron-based additive contained in the nonaqueous electrolyte to the mass of the positive active material contained in the positive composite is set to be equal to or more than the above lower limit, thereby making it possible to manufacture a nonaqueous electrolyte energy storage device with the adequately high content of the boron element in the positive composite layer and the further reduced rate of increase in direct-current resistance after a charge-discharge cycle under high temperature. From the viewpoint of reducing the initial direct-current resistance, the upper limit of the content of the boron-based additive contained in the nonaqueous electrolyte is preferably 10% by mass, more preferably 8% by mass, and the upper limit of the ratio of the mass of the boron-based additive contained in the nonaqueous electrolyte to the mass of the positive active material contained in the positive composite layer is preferably 5.0% by mass, more preferably 4.0% by mass.

[Negative Electrode Preparation Step]

In the negative electrode preparation step, a negative electrode can be prepared by a known method with the use of a negative composite paste containing a negative composite. The negative electrode can be obtained by laminating the negative composite layer directly on a negative substrate or laminating the negative composite layer on the negative substrate with an intermediate layer interposed therebetween. The negative composite layer is laminated, for example, by applying a negative composite paste to the negative substrate. The negative composite paste may include a dispersion medium. As the dispersion medium, it is possible to use, for example, an aqueous solvent such as water or a mixed solvent mainly composed of water.

[Nonaqueous Electrolyte Preparation Step]

In the nonaqueous electrolyte preparation step, for example, a sulfuric acid ester compound is added to a nonaqueous solvent to dissolve these components, thereby allowing the preparation of a nonaqueous electrolyte containing the sulfuric acid ester compound. The nonaqueous electrolyte may further have dissolve components such as an electrolyte salt dissolved. The dissolution can be performed by a known method.

The method for manufacturing the nonaqueous electrolyte energy storage device may include the following steps in addition to the positive electrode preparation step, the negative electrode preparation step, and the nonaqueous electrolyte preparation step. More specifically the method for manufacturing the nonaqueous electrolyte energy storage device can include, for example, forming an electrode assembly in which the positive electrode and the negative electrode are alternately superposed by stacking or winding the positive electrode and the negative electrode with a separator interposed between the electrodes, housing the positive electrode and the negative electrode in a case, and filling the case with the nonaqueous electrolyte. After these steps, a nonaqueous electrolyte energy storage device can be obtained by sealing a port for electrolyte solution filling. In addition, after the injection port is sealed, first charge-discharge may be performed. A film containing a boron element and a decomposition product from the sulfuric acid ester is presumed to be formed at the time of the initial charge-discharge.

The details of each element constituting the nonaqueous electrolyte energy storage device obtained by the manufacturing method mentioned above are considered as described above. The method for manufacturing the nonaqueous electrolyte energy storage device is capable of manufacturing a nonaqueous electrolyte energy storage device with the reduced rate of increase in direct-current resistance after a charge-discharge cycle under high temperature.

Other Embodiments

The nonaqueous electrolyte energy storage device according to an embodiment the present invention and the method for manufacturing the nonaqueous electrolyte energy storage device are not to be considered limited to the embodiment mentioned above, and various changes may be made without departing from the gist of the present invention. For example, the configuration according to one embodiment can be added to the configuration according to another embodiment, or a part of the configuration according to one embodiment can be replaced with the configuration according to another embodiment or a well-known technique. Furthermore, a part of the configuration according to one embodiment can be removed. In addition, a well-known technique can be added to the configuration according to one embodiment.

In the above embodiment, although the case where the energy storage device is a nonaqueous electrolyte secondary battery (for example, lithium ion secondary battery) that can be charged and discharged has been described, the type, shape, size, capacity, and the like of the energy storage device are arbitrary. The present invention can also be applied to capacitors such as various secondary batteries, electric double layer capacitors, and lithium ion capacitors.

EXAMPLES

Hereinafter, the present invention will be described in more detail with reference to examples, but the present invention is not limited to the following examples.

Comparative Example 1

(Fabrication of Positive Electrode)

A positive electrode containing, as a positive active material, NCM ($LiNi_{0.6}Mn_{0.2}Co_{0.2}O_2$) having an $\alpha$-$NaFeO_2$-type crystal structure was fabricated by the following method. Prepared was a positive composite paste containing the positive active material, a polyvinylidene fluoride (PVDF) as a binder, and acetylene black as a conductive agent, with n-methyl-2-pyrrolidone (NMP) as a dispersion medium. The mixing ratios of the positive active material, binder, and conductive agent were 94:3:3 in ratio by mass. The positive composite paste was applied to both surfaces of a positive substrate, dried, and pressed to form a positive composite layer. For the positive substrate, an aluminum foil of 15 μm in thickness was used.

(Fabrication of Negative Electrode)

A negative electrode was fabricated by the following method. Prepared was a negative composite paste containing a negative active material, a styrene-butadiene rubber as a binder, and a carboxymethyl cellulose as a thickener with water as a dispersion medium. The mixing ratios of the negative active material, binder, and thickener were 98:1:1 in ratio by mass. Graphite and hardly graphitizable carbon mixed at 85:15 in ratio by mass were used for the negative active material. The negative composite paste was applied to both surfaces of a negative substrate and dried to form a negative composite layer. For the negative substrate, a copper foil of 10 μm in thickness was used.

(Preparation of Nonaqueous Electrolyte)

A nonaqueous solution was prepared by dissolving $LiPF_6$ at a concentration of 1.0 mol/$dm^3$ in a nonaqueous solvent of an ethylene carbonate (EC), a propylene carbonate (PC), and an ethyl methyl carbonate (EMC) mixed at a volume ratio of 25:5:70. As the sulfuric acid ester compound, 4,4'-bis(2,2-dioxo-1,3,2-dioxathiolane) (hereinafter, referred to as a "sulfuric acid ester compound (A)") was used, and added to the nonaqueous solution such that the content of the sulfuric acid ester compound (A) (referred to as the content per mass based on the mass of the nonaqueous solution regarded as 100, the same applies hereinafter) was 1.0% by mass. Furthermore, a nonaqueous electrolyte was prepared by adding a vinylene carbonate (VC) and a lithium difluorophosphate (LiDFP) such that the contents thereof were respectively 0.2% by mass and 0.5% by mass.

(Fabrication of Nonaqueous Electrolyte Energy Storage Device)

The positive electrode and the negative electrode were stacked with a separator interposed therebetween, composed of a substrate layer of a porous resin film made of a polyethylene and a heat resistant layer formed on the substrate layer, thereby fabricating an electrode assembly. The electrode assembly was housed into an aluminum prismatic container case (case), and a positive electrode terminal and a negative electrode terminal were attached. The nonaqueous electrolyte was injected by electrolyte solution filling into the case, the case was then sealed, and the obtained battery was subjected to initial charge-discharge under the following conditions to fabricate a nonaqueous electrolyte energy storage device (nonaqueous electrolyte secondary battery) according to Comparative Example 1. The rated capacity of the nonaqueous electrolyte energy storage device is 900 mAh.

(Initial Charge-Discharge)

The battery was subjected to constant current charge at a charge current of 0.1 C up to 4.25 V in a constant temperature bath at 25° C., and then constant voltage charge at 4.25 V. With regard to the charge termination conditions, charge was performed until the charge current reached 0.05 C. After charge, a pause time of 10 minutes was provided, and then constant current discharge was performed at 25° C. to 2.75 V at a discharge current of 0.2 C.

Example 1

A nonaqueous electrolyte energy storage device according to Example 1 was fabricated similarly to Comparative Example 1 except that a boron compound was contained in a positive composite paste such that the content of a boron element in the positive composite was 0.081% by mass.

Example 2

A nonaqueous electrolyte energy storage device according to Example 2 was fabricated similarly to Example 1 except for using only graphite as a negative active material.

Example 3

A nonaqueous electrolyte energy storage device according to Example 3 was fabricated similarly to Example 1 except that a lithium difluoro oxalato borate (LiFOB) was further added as a boron-based additive to the nonaqueous electrolyte such that the content of the lithium difluoro oxalato borate was 0.5% by mass.

Examples 4 and 5 and Comparative Examples 2 to 4

Respective nonaqueous electrolyte energy storage devices according to Examples 4 and 5 and Comparative Examples 2 to 4 were fabricated similarly to Comparative Example 1, except for the contents of the sulfuric acid ester compound, VC, LiDFP, and LiFOB as shown in Table 1 below.

Comparative Examples 5 and 6 and Reference Example 1

Respective nonaqueous electrolyte energy storage devices according to Examples 5 and 6 and Reference Example 1 were fabricated similarly to Example 1, except for the additive to be added to the nonaqueous solution as shown in Table 1 below. Further, in Reference Example 1, for the additive to be added to the nonaqueous solution, 1,3-propenesultone (PRS) as a cyclic sulfonic acid ester compound was added instead of the sulfuric acid ester compound such that the content of the PRS was 1.0% by mass.

(Content of Boron Element in Positive Composite Layer)

In the positive composite layers in the positive electrodes in the nonaqueous electrolyte energy storage devices fabricated according to Examples 1 to 5, Comparative Examples 1 to 6, and Reference Example 1, the boron element contents were as shown in Table 1 below. It is to be noted that the boron element contents are considered contents after the fabrication of the nonaqueous electrolyte energy storage devices (the contents per mass in the case of regarding, as 100, the mass of the whole positive composite layer after the first charge-discharge step), quantitatively determined by inductively coupled plasma emission spectrometry. Further, the ratio of the mass of LiFOB in the nonaqueous electrolyte to the mass of the positive active material in the positive composite is also shown together for Examples 3 to 5 and Comparative Examples 2 to 5 in which LiFOB was contained in the nonaqueous electrolytes.

[Evaluation]

(Initial Direct-Current Resistance)

The initial direct-current resistance in the nonaqueous electrolyte energy storage device was determined as follows. First, in a constant temperature bath at 25° C., the nonaqueous electrolyte energy storage devices according to Examples 1 to 5, Comparative Examples 1 to 6, and Reference Example 1 were each subjected to constant current charge at a charge current of 1.0 C up to a voltage at which the SOC (State of Charge) reached 50%, and then subjected to constant voltage charge. With regard to the charge termination conditions, charge was performed until the total charge time reached 5 hours. After causing the SOC of the nonaqueous electrolyte energy storage device to reach 50% under the above-mentioned conditions, the devices were then discharged for 10 seconds at discharge current values of 0.1 C, 0.2 C, and 0.3 C and from the graph of current-voltage characteristics obtained by plotting the voltage 10 seconds after the start of the discharge on the vertical axis and the discharge current value on the horizontal axis, the direct-current resistance value as a value corresponding to the slope was determined. This value was defined as the initial direct-current resistance at 25° C. In addition, the initial direct-current resistance at −10° C. was also determined in the same manner as described above except that each nonaqueous electrolyte energy storage device was placed in a constant temperature bath at −10° C., allowed to stand for 5 hours, and then discharged. Table 1 below shows the relative value (%) of the initial direct-current resistance in each nonaqueous electrolyte energy storage device, with the measured value of Comparative Example 1 as 100%.

(Charge-Discharge Cycle Test at 45° C.)

A charge-discharge cycle test at 45° C. was performed as follows. Each of the nonaqueous electrolyte energy storage devices subjected to the first charge-discharge was allowed to stand for 5 hours in a constant temperature bath at 45° C., was then subjected to constant current charge at a charge current of 1 C up to 4.25 V, and then subjected to constant voltage charge at 4.25 V. With regard to the charge termination conditions, charge was performed until the total charge time reached 5 hours. Thereafter, constant current discharge was performed at a discharge current of 1.0 C up to 2.75 V. In all of the cycles, a pause time of 10 minutes was set after the charge and after the discharge. The steps of charge and discharge were regarded as one cycle, and the cycle was repeated 300 times. The charge, the discharge, and the pause were all carried out in a constant temperature bath at 45° C.

(Rate of Increase in Resistance after Charge-Discharge Cycle Test at 45° C.)

The rate of increase in the resistance of the nonaqueous electrolyte energy storage device after the charge-discharge cycle test at 45° C. was determined as follows. The nonaqueous electrolyte energy storage device after the charge-discharge cycle test at 45° C. was allowed to stand for 5 hours or longer in a constant temperature bath at 25° C. The value of the direct-current resistance after the charge-discharge cycle test at 45° C. was determined similarly to the initial direct-current resistance. The value, expressed as a percentage, of the rate of increase in direct-current resistance after the charge-discharge cycle test at 45° C. with respect to the initial direct-current resistance at 25° C. was determined by the following formula as "the rate of increase in resistance after the charge-discharge cycle at 45° C.".

Rate of increase in resistance after charge-discharge cycle at 45° C.=(direct-current resistance after charge-discharge cycle test at 45° C.)/(initial direct-current resistance)×100-100

Table 1 below shows the value of the rate of increase in resistance after the charge-discharge cycle at 45° C. in each of the nonaqueous electrolyte energy storage devices according to Examples 1 to 5, Comparative Examples 1 to 6, and Reference Example 1.

TABLE 1

| | Additive for Nonaqueous Electrolyte [% by mass] | | Positive Composite Layer: Ratio of LiFOB to Positive Active Material [% by mass] | Positive Composite Layer: Content of Boron Element in Positive Composite Layer [% by mass] | Positive Composite Layer: Addition of Boron Compound | Negative Active Material [% by mass] | Evaluation: Rate of Increase in Resistance after Charge-Discharge Cycle at 45° C. [%] | Evaluation: (25° C.) Initial Direct-Current Resistance [%] | Evaluation: (−10° C.) Initial Direct-Current Resistance [%] |
|---|---|---|---|---|---|---|---|---|---|
| Example 1 | VC<br>Sulfate Compound (A)<br>LiDFP | 0.2<br>1.0<br>0.5 | — | 0.081 | Yes | Graphite:hardly graphitizable carbon = 85/15 | 4.1 | 99.1 | 93.7 |
| Example 2 | VC<br>Sulfate Compound (A)<br>LiDFP | 0.2<br>1.0<br>0.5 | — | 0.081 | Yes | Graphite | 8.2 | 97.9 | 95.0 |
| Example 3 | VC<br>Sulfate Compound (A)<br>LiDFP<br>LiFOB | 0.2<br>1.0<br>0.5<br>0.5 | 0.28 | 0.085 | Yes | Graphite:hardly graphitizable carbon = 85/15 | 6.0 | 106.1 | 83.9 |
| Example 4 | VC<br>Sulfate Compound (A)<br>LiDFP<br>LiFOB | 0.2<br>1.0<br>0.5<br>5.0 | 2.7 | 0.050 | No | Graphite:hardly graphitizable carbon = 85/15 | 5.1 | 109.4 | 126.5 |
| Example 5 | VC<br>Sulfate Compound (A)<br>LiDFP<br>LiFOB | 0.2<br>1.0<br>0.5<br>3.0 | 1.6 | 0.030 | No | Graphite:hardly graphitizable carbon = 85/15 | 8.3 | 105.8 | 126.2 |
| Comparative Example 1 | VC<br>Sulfate Compound (A)<br>LiDFP | 0.2<br>1.0<br>0.5 | — | 0 | No | Graphite:hardly graphitizable carbon = 85/15 | 24.8 | 100.0 | 100.0 |
| Comparative Example 2 | VC<br>Sulfate Compound (A)<br>LiDFP<br>LiFOB | 0.2<br>1.0<br>0.5<br>0.2 | 0.11 | 0.002 | No | Graphite:hardly graphitizable carbon = 85/15 | 21.6 | 99.8 | 105.8 |
| Comparative Example 3 | VC<br>Sulfate Compound (A)<br>LiDFP<br>LiFOB | 0.2<br>1.0<br>0.5<br>0.5 | 0.28 | 0.005 | No | Graphite:hardly graphitizable carbon = 85/15 | 14.7 | 102.0 | 118.5 |
| Comparative Example 4 | VC<br>Sulfate Compound (A)<br>LiDFP<br>LiFOB | 0.2<br>1.0<br>0.5<br>1.0 | 0.56 | 0.010 | No | Graphite:hardly graphitizable carbon = 85/15 | 13.2 | 102.9 | 123.2 |
| Comparative Example 5 | VC<br>LiFOB | 0.2<br>0.5 | 0.28 | 0.086 | Yes | Graphite:hardly graphitizable carbon = 85/15 | 33.9 | 105.9 | 118.1 |
| Comparative Example 6 | VC | 1.0 | — | 0.081 | Yes | Graphite:hardly graphitizable carbon = 85/15 | 70.3 | 102.3 | 128.6 |
| Reference Example 1 | VC<br>PRS<br>LiDFP | 0.2<br>1.0<br>0.5 | — | 0.081 | Yes | Graphite:hardly graphitizable carbon = 85/15 | −5.2 | 114.1 | 191.9 |

From the results shown in Table 1, it is determined that the nonaqueous electrolyte energy storage devices according to Examples 1 to 5 in which the positive composite layer containing the transition metal oxide further contains a boron element, the content of the boron element in the positive composite layer is 0.03% by mass or more, and the nonaqueous electrolyte contains the sulfuric acid ester compound have successfully reduced the rate of increase in direct-current resistance after the charge-discharge cycle test at 45° C. In contrast, the nonaqueous electrolyte energy storage devices according to Comparative Examples 2 to 4 in which the content of the boron element in the positive composite layer is less than 0.03% by mass, and the nonaqueous electrolyte contains a sulfuric acid ester compound have reduced the rate of increase in direct-current resistance after the charge-discharge cycle test at 45° C. more than the nonaqueous electrolyte energy storage device according to Comparative Example 1 in which the positive composite layer contains no boron element, but failed to achieve such a striking effect achieved by the nonaqueous electrolyte energy storage devices according to Examples 1 to 5. In addition, even with the content of the boron element being 0.03% by mass or more of the positive composite, the nonaqueous electrolyte energy storage devices according to Comparative Examples 5 and 6 in which the nonaqueous electrolyte contains no sulfuric acid ester compound have failed to reduce the rate of increase in direct-current resistance after the charge-discharge cycle test at 45° C.

In addition, as shown in the evaluation result of the nonaqueous electrolyte energy storage device according to Reference Example 1 in Table 1, it is determined that the initial direct-current resistances of the nonaqueous electrolyte energy storage device at 25° C. and −10° C. are remarkably high when the nonaqueous electrolyte contains the cyclic sulfonic acid ester. More specifically, the nonaqueous electrolyte energy storage device in which the nonaqueous electrolyte contains the cyclic sulfonic acid ester is capable of reducing the rate of increase in direct-current resistance after the charge-discharge cycle at 45° C., but because of the remarkably high initial direct-current resistance, inferior to the nonaqueous electrolyte energy storage devices according to Examples 1 to 5 in terms of power performance. In contrast, there is no significant difference in initial direct-current resistance among the nonaqueous electrolyte energy storage devices according to Examples 1 to 5 and Comparative Examples 1 to 6.

As described above, it has been demonstrated that the nonaqueous electrolyte energy storage device is capable of reducing the rate of increase in direct-current resistance after a charge-discharge cycle under high temperature, and also favorable in initial direct-current resistance at ordinary temperatures and low temperatures.

INDUSTRIAL APPLICABILITY

The present invention is suitably used as a nonaqueous electrolyte energy storage device including a nonaqueous electrolyte secondary battery used as a power source for electronic equipment such as personal computers and communication terminals, automobiles, and the like.

DESCRIPTION OF REFERENCE SIGNS

1: nonaqueous electrolyte energy storage device

2: electrode assembly

3: case

4: positive electrode terminal

41: positive electrode lead

5: negative electrode terminal

51: negative electrode lead

20: energy storage unit

30: energy storage apparatus

The invention claimed is:

1. A nonaqueous electrolyte energy storage device comprising:

a positive electrode comprising a positive composite layer containing a transition metal oxide and an elemental boron;

a negative electrode; and a nonaqueous electrolyte containing a sulfuric acid ester compound, wherein a content of the elemental boron in the positive composite layer is 0.03% by mass or more, and the sulfuric acid ester compound includes a compound represented by the following formula (4):

(4)

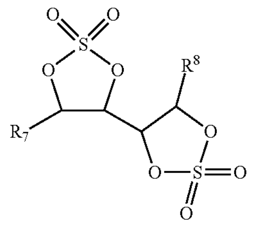

where $R^7$ and $R^8$ each independently represent a halogen atom, an alkyl group having 1 to 4 carbon atoms, or a halogenated alkyl group having 1 to 4 carbon atoms.

2. The nonaqueous electrolyte energy storage device according to claim 1, wherein the transition metal oxide comprises a nickel element, a cobalt element, and at least one selected from the group consisting of a manganese element and an aluminum element.

3. A method for manufacturing a nonaqueous electrolyte energy storage device, the method comprising:

preparing a positive electrode comprising a positive composite layer containing a transition metal oxide and an elemental boron;

preparing a negative electrode; and preparing a nonaqueous electrolyte containing a sulfuric acid ester compound, wherein the preparing the positive electrode comprises:

providing the positive composite layer containing the elemental boron such that a content of the elemental boron in the positive composite layer is 0.03% by mass or more, and the sulfuric acid ester compound includes a compound represented by the following formula (4):

(4)

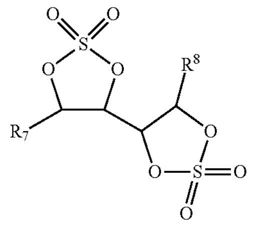

where $R^7$ and $R^8$ each independently represent a halogen atom, an alkyl group having 1 to 4 carbon atoms, or a halogenated alkyl group having 1 to 4 carbon atoms.

4. The nonaqueous electrolyte energy storage device according to claim 1, wherein the transition metal oxide has an α-$NaFeO_2$-type crystal structure.

5. The method according to claim 3, wherein the transition metal oxide has an α-$NaFeO_2$-type crystal structure.

6. The method according to claim 3, further comprising providing the positive composite layer containing the transition metal oxide and the elemental boron by mixing a positive composite with a boron compound, adding the elemental boron to particles of the transition metal oxide, coating the particles of the transition metal oxide with the elemental boron, or adding a boron-based additive to the nonaqueous electrolyte and then charging and discharging the nonaqueous electrolyte energy storage device in which the boron-based additive is added to the nonaqueous electrolyte, wherein the boron compound is selected from a group consisting of a boric acid, a boron oxide, a lithium tetraborate and an ammonium borate, and the boron-based additive is selected from a group consisting of lithium bisoxalate borate, a lithium difluoroxalate borate, a lithium tetrafluoroborate, a borate ester and a boroxine compound.

* * * * *